US008662934B2

(12) United States Patent
Scritzky et al.

(10) Patent No.: US 8,662,934 B2
(45) Date of Patent: *Mar. 4, 2014

(54) SIMPLIFIED CONNECTOR RECEPTACLES

(75) Inventors: Robert Scritzky, Sunnyvale, CA (US);
Joshua R. Funamura, San Jose, CA
(US); George V. Anastas, San Carlos,
CA (US); John Raff, Menlo Park, CA
(US); Henry Jules, Palo Alto, CA (US);
Kevin D. Gibbs, San Carlos, CA (US);
Carl R. Peterson, Santa Clara, CA (US)

(73) Assignee: Apple Inc., Cupertino, CA (US)

( * ) Notice: Subject to any disclaimer, the term of this
patent is extended or adjusted under 35
U.S.C. 154(b) by 50 days.

This patent is subject to a terminal disclaimer.

(21) Appl. No.: 13/412,587

(22) Filed: Mar. 5, 2012

(65) Prior Publication Data
US 2013/0065437 A1    Mar. 14, 2013

Related U.S. Application Data

(60) Provisional application No. 61/500,592, filed on Jun. 23, 2011.

(51) Int. Cl.
H01R 13/648 (2006.01)
(52) U.S. Cl.
USPC ............... 439/660; 439/607.17; 439/108
(58) Field of Classification Search
USPC .............. 439/660, 607.17, 607.36, 607.35, 439/607.4, 108
See application file for complete search history.

(56) References Cited

U.S. PATENT DOCUMENTS

| 6,074,225 | A  |   | 6/2000  | Wu et al. |
| 6,431,887 | B1 | * | 8/2002  | Yeomans et al. ............. 439/108 |
| 6,524,130 | B1 | * | 2/2003  | Yeh ............................ 439/541.5 |
| 6,634,894 | B1 | * | 10/2003 | Ko .............................. 439/108 |
| 6,685,488 | B2 | * | 2/2004  | Billman et al. ............... 439/108 |
| 6,863,537 | B2 | * | 3/2005  | Pellizari ......................... 439/31 |
| 7,182,618 | B1 | * | 2/2007  | Choy et al. .................... 439/328 |
| 7,402,084 | B2 |   | 7/2008  | Wu |
| 7,540,786 | B1 |   | 6/2009  | Koser et al. |
| 7,553,187 | B2 | * | 6/2009  | Feldman et al. ......... 439/607.17 |
| 7,699,629 | B2 | * | 4/2010  | Sasser et al. ................. 439/108 |
| 7,794,262 | B2 | * | 9/2010  | Briant et al. ................. 439/352 |
| 7,901,221 | B1 |   | 3/2011  | Li et al. |
| 8,016,620 | B1 |   | 9/2011  | Chiu et al. |
| 8,133,080 | B2 |   | 3/2012  | Murakami |

(Continued)

FOREIGN PATENT DOCUMENTS

WO    2006/014541 A1    2/2006

OTHER PUBLICATIONS

International Search Report dated Sep. 26, 2012, from PCT Patent Application No. PCT/US2012/043583, 108 pages.

(Continued)

Primary Examiner — Gary Paumen
(74) Attorney, Agent, or Firm — Kilpatrick Townsend & Stockton LLP

(57) ABSTRACT

Connector receptacles that may be used in a variety of applications, may have a desirable aesthetic appearance, may be durable and reliable, and may be manufactured in a simplified manner. One example may provide a receptacle that may be used in a number of different devices to avoid having to redesign a receptacle for different devices. Another example may maintain a desirable appearance by reducing the chance of marring or functional damage during insertions of an insert.

31 Claims, 21 Drawing Sheets

(56) References Cited

U.S. PATENT DOCUMENTS

| | | |
|---|---|---|
| 8,475,216 B2 | 7/2013 | Tung et al. |
| 2002/0137373 A1* | 9/2002 | Billman et al. ............... 439/108 |
| 2005/0026501 A1 | 2/2005 | Zhan et al. |
| 2009/0067141 A1 | 3/2009 | Dabov et al. |
| 2010/0041257 A1* | 2/2010 | Beck et al. .................... 439/108 |
| 2010/0087077 A1 | 4/2010 | Chiang et al. |
| 2010/0093221 A1 | 4/2010 | Mao et al. |
| 2011/0021088 A1 | 1/2011 | Chen et al. |

OTHER PUBLICATIONS

Invitation to Pay Fees dated Sep. 26, 2012, from PCT Patent Application No. PCT/US2012/043583, 9 pages.

International Search Report and Written Opinion mailed on Jan. 17, 2013, from PCT Patent Application No. PCT/US2012/043583, 21 pages.

Non-Final Office Action mailed on Jul. 23, 2013 for U.S. Appl. No. 13/270,202, 5 pages.

* cited by examiner

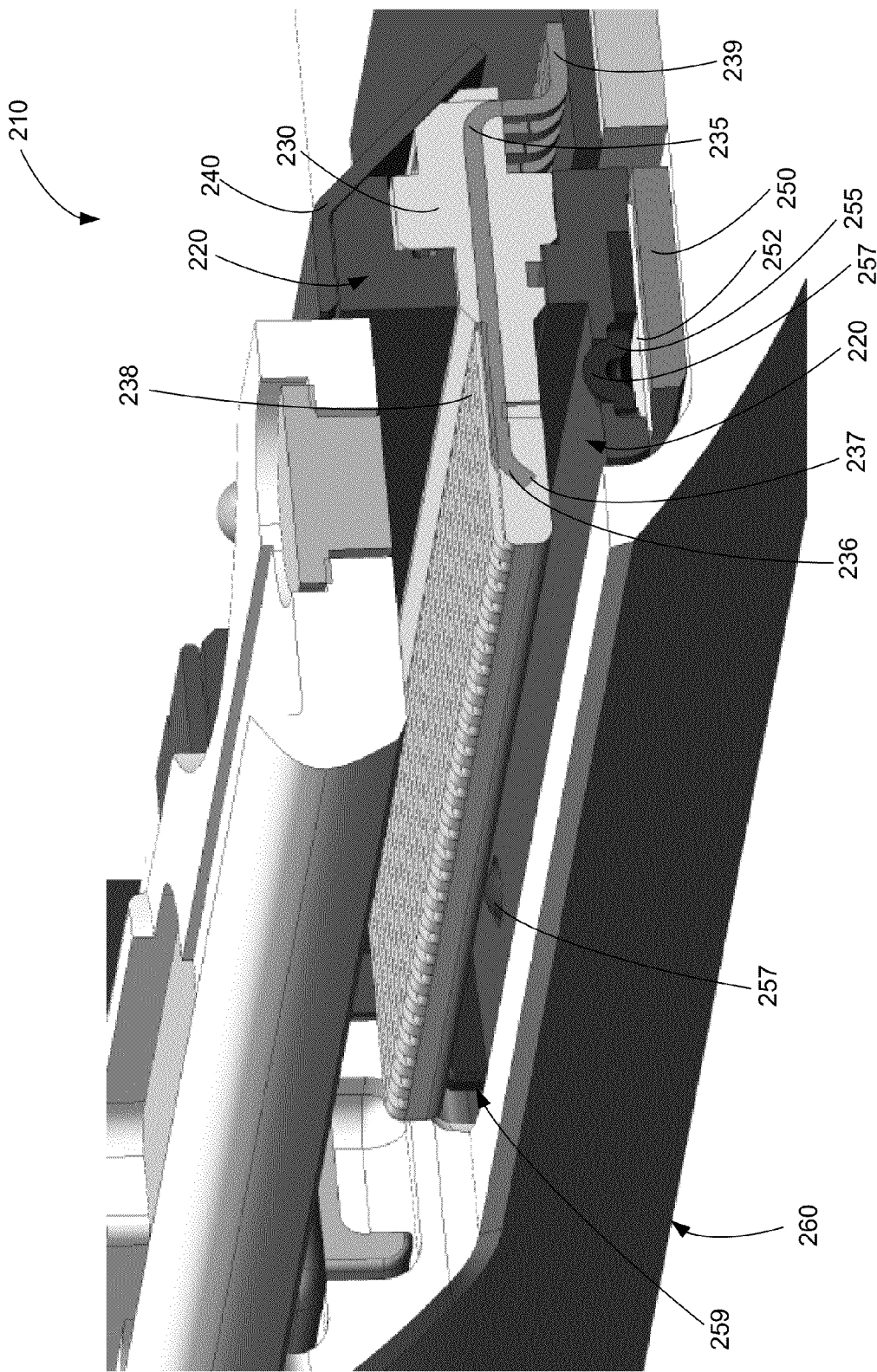

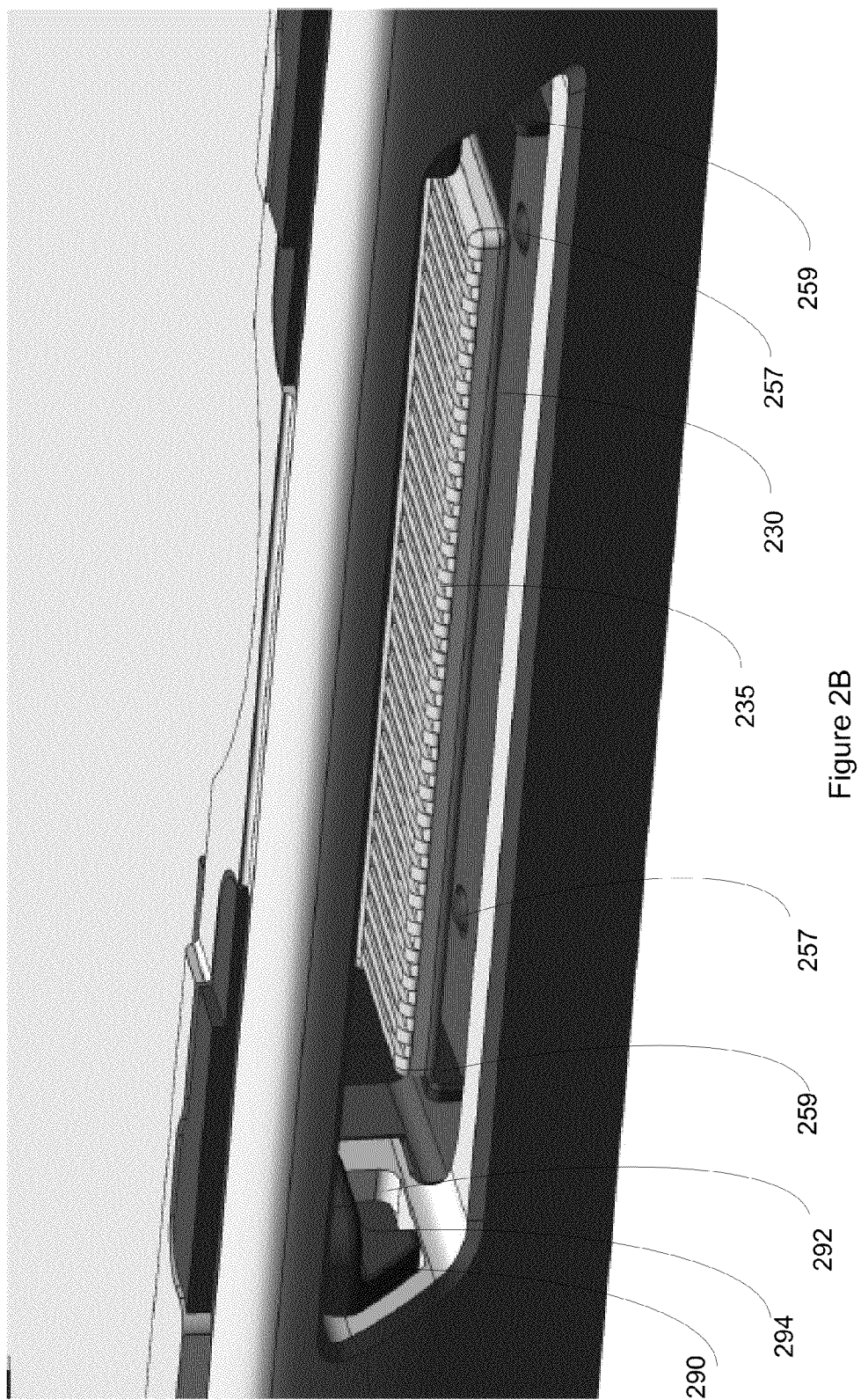

SIMPLIFIED CONNECTOR RECEPTACLES

CROSS-REFERENCES TO RELATED APPLICATIONS

This application claims the benefit of U.S. provisional patent application No. 61/500,592, filed Jun. 23, 2011, which is incorporated by reference. This application is related to and also incorporates U.S. patent application Ser. No. 13/270,202, filed Oct. 10, 2011, by reference.

BACKGROUND

The number of types of electronic devices that are commercially available has increased tremendously the past few years, and the rate of introduction of new devices shows no signs of abating. Devices, such as tablet, laptop, netbook, desktop, and all-in-one computers, cell, smart, and media phones, storage devices, portable media players, navigation systems, monitors, and others, have become ubiquitous.

Often, these devices communicate with other devices. As just one example, a laptop computer may communicate with a portable computing or other device. Such communications may take place over a cable. The cable may have connector inserts on each end, where the connector inserts mate with connector receptacles on the laptop and portable computing device.

These various devices may have different form factors, thereby necessitating the use of different device housings or enclosures. But this often means that different connector receptacles need to be designed and developed for each new device. This complexity adds development costs and slows the introduction of new devices to the marketplace.

Also, these connector receptacles are often formed of several pieces fitted together. This arrangement may provide an aesthetically challenged appearance to an electronic device. This may be particularly true where a connector receptacle is relatively large, or where several connector receptacles are placed near each other on a device.

Moreover, connector inserts may be inserted into these connector receptacles several times during a device's lifetime. For example, a connector insert may be inserted one or more times a day over a period of years. Such repeated inserts may mar or wear surfaces in the connector receptacle and insert, and cause other functional or aesthetic damage.

Thus, what is needed are connector receptacles that may be used in various types of devices to reduce development costs, have a pleasing aesthetic appearance, are durable and reliable such that they avoid marring and functional damage, and are easy to manufacture.

SUMMARY

Accordingly, embodiments of the present invention may provide connector receptacles that may be used in a variety of applications, may have a desirable aesthetic appearance, may be durable and reliable, and may be manufactured in a simplified manner.

An exemplary embodiment of the present invention may provide a connector receptacle that may be used in a number of different devices. This may avoid the necessity of having to redesign a connector receptacle for different devices, which in turn may speed design times and reduce development costs. A specific embodiment of the present invention may achieve this by providing a simplified connector receptacle where many components often associated with the connector receptacle are instead found on, attached to, or otherwise associated with the device housing or enclosure. In various embodiments of the present invention, keying, retention, shielding, grounding, and other features may be found on, attached to, or otherwise associated with the device housing. By providing these features separately from the connector receptacle, the connector receptacle design may be made simple and reusable for other applications, and each feature may be formed from different materials, thereby optimizing performance. For example, these elements may be formed using nickel plated steel, stainless steel, copper, brass, or other appropriate material.

In these and other embodiments of the present invention, portions of the connector receptacle housing may be formed with, and as part of, the device housing. This may provide an aesthetically-pleasing, seamless appearance to the connector receptacle.

Another exemplary embodiment of the present invention may maintain a desirable appearance for a connector receptacle and connector insert by reducing wear and the chance of marring or functional damage during insertions of the connector insert into the connector receptacle. A specific embodiment of the present invention may achieve this by bending front portions of connector receptacle contacts at an angle. In various embodiments, the front portions may bend in a way that they are covered by the plastic or other material that forms a tongue in a connector receptacle. Burying contact front edges in this way reduces wear and marring of connector inserts that are inserted in the connector receptacle. In various embodiments of the present invention, the connector receptacle may include one or more electromagnetic interference contacts that connect to a shield on a connector insert during insertion. These contacts may have a domed or spherical-shaped top portion to reduce wear and marring of the connector insert.

Another exemplary embodiment of the present invention may provide a reliable and durable connector receptacle. In a specific embodiment of the present invention, a tongue may be injection molded around contacts of a connector receptacle. By forming the tongue using injection molding, contacts of the connector receptacle may be mechanically supported in a reliable and durable manner, and a seal may be formed around each contact to protect the electronic device from moisture. In various embodiments of the present invention, one or more contacts may be comparatively wider or thicker for increased current carrying capability. The tongue may be formed to snap or otherwise securely fit in a housing portion. This secure fit may form a moisture resistant seal, thereby protecting components inside the electronic device that includes the connector receptacle.

Another exemplary embodiment of the present invention may provide a connector receptacle that may be easily manufactured. A specific embodiment of the present invention may provide a connector receptacle having multiple metal pieces that may be soldered, fused, or otherwise fixed together. These pieces may be arranged such that they may be soldered together in one step, thereby simplifying the manufacturing process.

Another exemplary embodiment of the present invention may provide a connector receptacle having a number of EMI or grounding tabs. These EMI tabs may contact a shield of a connector insert when the connector insert is inserted into the connector receptacle. These EMI tabs may be formed on an EMI strip, where each tab connects to the EMI strip over an arm that provides a spring force when the connector insert is inserted. The EMI strip may be spot or laser-welded, or otherwise attached to a shield of the connector receptacle.

Various electronic devices may be improved by the incorporation of embodiments of the present invention. For example, devices such as portable computing devices, tablet, laptop, netbook, desktop, and all-in-one computers, cell, smart, and media phones, storage devices, portable media players, navigation systems, monitors, and others, may be improved by the incorporation of embodiments of the present invention.

Various embodiments of the present invention may incorporate one or more of these and the other features described herein. A better understanding of the nature and advantages of the present invention may be gained by reference to the following detailed description and the accompanying drawings.

BRIEF DESCRIPTION OF THE DRAWINGS

FIG. 2A illustrates a cutaway view of a connector receptacle located in a device housing according to an embodiment of the present invention, while FIG. 2B illustrates a front top view of a connector receptacle located in a device housing according to an embodiment of the present invention;

FIG. 3A illustrates another cutaway view of a connector receptacle according to an embodiment of the present invention, while

DESCRIPTION OF EXEMPLARY EMBODIMENTS

Figure 1:
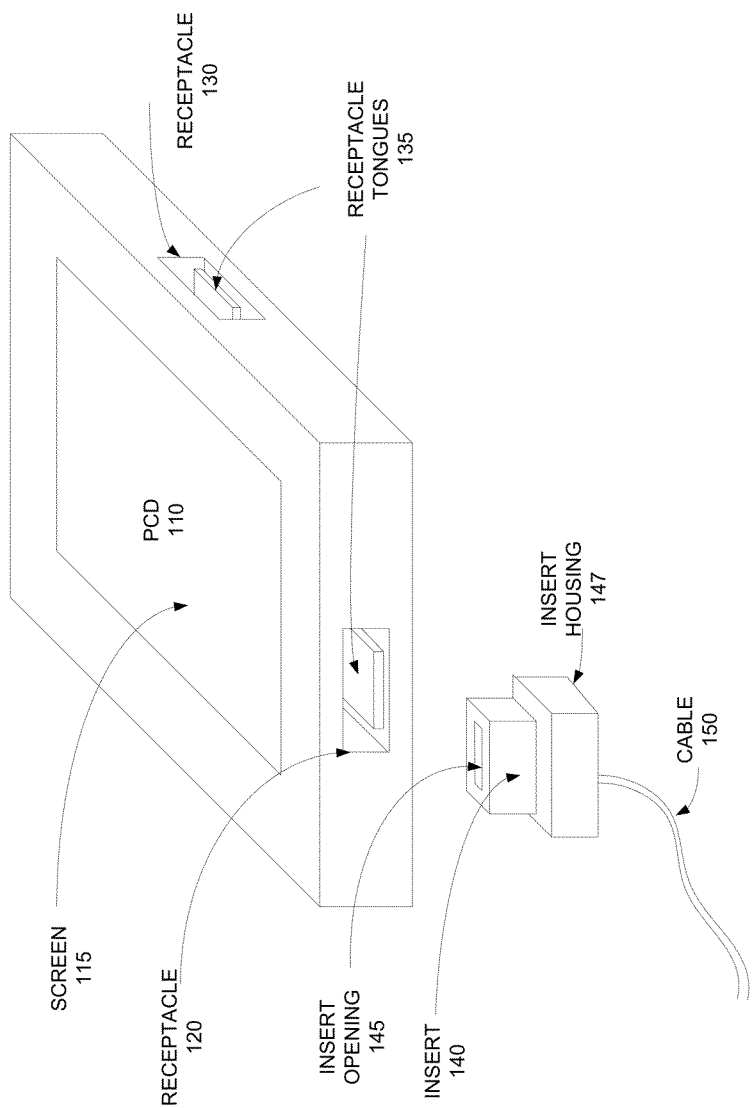
FIG. 1 illustrates a portable computing device that may be improved by the incorporation of embodiments of the present invention.

FIG. 1 illustrates a portable computing device 110 that may be improved by the incorporation of embodiments of the present invention. This figure, as with the other included figures, is shown for illustrative purposes and does not limit either the possible embodiments of the present invention or the claims.

Portable computing device 110 may be a portable computing device, tablet, laptop, netbook, desktop, and all-in-one computer, cell, smart, or media phone, storage device, portable media player, navigation system, monitor, or other type of device. Portable computing device 110 may include a touchscreen 115, or other input and display devices. Portable computing device 110 may include one or more connector receptacles, such as receptacle 120 and receptacle 130. Receptacles 120 and 130 may include tongues such as receptacle tongues 135. A connector insert, such as connector insert 140, may be formed to fit in receptacles 120 and 130. Connector insert 140 may have an insert opening 145 to accept receptacle tongues 135. Insert 140 may include an insert housing 147 for manipulation by a user. Cable 150 may be used to connect portable computing device 110 to a second electronic device (not shown). For example, cable 150 may be used to connect portable computing device 110 to a laptop, netbook, a desktop, a second tablet, or other type of electronic device.

In this example, two receptacles 120 and 130 are shown. In various embodiments of the present invention, one, two, or more than two receptacles may be present. These receptacles may be different types of receptacles for accepting various types of connector inserts.

Again, various types of devices, such as various personal computing devices 110, typically each need their own specifically designed connector receptacles. Having to design a connector receptacle for each device may slow new product introductions and add development costs. Accordingly, embodiments of the present invention provide connector receptacles that may be used in various types of devices. An example is shown in the following figures.

FIG. 2A illustrates a cutaway view of a connector receptacle 210 located in a device housing 260 according to an embodiment of the present invention. Connector receptacle 210 may include first housing portion 220, tongue 230, shield 240, and mounting bracket 250. Connector receptacle 210 may further include a number of contacts 235 and first metallic portion or electromagnetic interference (EMI) bracket 255 including EMI contacts 257 and keys 259.

Again, a connector insert may be inserted to make contact with connector receptacle 210 thousands of times over the device's lifetime. Such insertions may mar surfaces on the connector receptacle or connector insert. For example, such marring may be caused by burrs or sharp edges on a leading edge of contacts in connector receptacle 210. Accordingly, contacts 235 may include a front portion 236 that may be angled downward such that its leading edge 237 is buried in tongue 230. By burying leading edges 237 in this manner, sharp leading edges 237 cannot mar or tarnish a connector insert. Also, leading edge 237 should not be able to catch on to or snag a connector insert and be bent or marred during insertion. Contacts 235 may also include top surface 238 for mating with contacts in a connector insert (not shown). Contacts 235 may also include surface mount or tail portions 239 for soldering to a flexible circuit board, printed circuit board, or other appropriate substrate. In various embodiments of the present invention, some or all of contacts 235 may have a relatively increased thickness for higher current carrying capabilities.

Tongue 230 may be injection molded around contacts 235. This may provide a secure mechanical support for contacts 235. This may also provide a moisture or water-resistant seal around contacts 235, thereby helping to protect components or circuits in the interior of the electronic device. This seal may also help prevent solder from wicking up to surfaces 238 of contacts 235 when tail portions 239 are soldered to a flexible circuit board, printed circuit board, or other appropriate substrate.

Tongue 230 may be formed to snap or otherwise securely fit in first housing portion 220. This secure fit may help to provide circuitry and components inside the device housing 260 from moisture or water damage. First housing portion 220 may form a connector receptacle housing along with a device enclosure 260. In this way, as a user observes the connector receptacle, some or all of the connector receptacle appears to be integrated with the device housing. This, in turn, provides an attractive appearance.

Housing 220 may be covered by shield 240. Shield 240 may be fixed to mounting bracket 250, which may be used to attach connector receptacle 210 to device enclosure 260. First metallic piece or EMI bracket 255 may be placed between mounting bracket 250 and housing 220. First metallic piece or EMI bracket 255 may include one or more electromagnetic interference contacts 257. Tape piece 252 may be used to fix first metallic piece or EMI bracket 255 to mounting bracket 250 during assembly. Ground or EMI contacts 257 may make contact with a metallic shield on a connector insert for electromagnetic interference purposes. Key 259 may be included to prevent an upside-down insertion of a connector insert. Ground or EMI contacts 257 and keys 259 may be formed of a single piece of metal or other conductive material.

Again, in various embodiments of the present invention, the different portions of the connector receptacle may be formed of various materials. For example, ground contacts 235, key 259, shield 240, first metallic piece or EMI bracket 255, and mounting bracket 250 may be formed of nickel plated steel, stainless steel, copper, brass, or other appropriate material. Tongue 230 and housing 220 may be formed using plastic or other insulative material.

FIG. 2B illustrates a front top view of a connector receptacle located in a device housing according to an embodiment of the present invention. Again, a number of contacts 235 may reside on a tongue 230. Ground or EMI contacts 257 may form electrical contact with a shield on a connector insert. Keys 259 may be included to prevent improper insertion. Ground or EMI contacts 257 and keys 259 may be formed of a single piece of conductive or other type of material.

In this example, a latch piece 290 is also included. Latch piece 290 may at least partially define an opening 292 having an edge 294. Opening 292 may accept a retractable tab on a connector insert when the connector insert is inserted into the connector receptacle. Edge 294 may act to retain the retractable tab to prevent accidental removal of the connector insert. Latch piece 290 may also provide a keying function to prevent an inverted insertion of a connector insert. Latch piece 290 may further provide a vertical alignment feature for a connector insert. That is, latch piece 290 may be formed to align a connector insert in the vertical direction when a connector insert is inserted into the connector receptacle. Latch pieces 290 may also be spaced to provide horizontal alignment for the connector insert.

In a specific embodiment of the present invention, ground contacts 257 and keys 259 may be included in the connector receptacle. In this specific embodiment, latch piece 290 is attached to the device enclosure 260, and is not part of the connector receptacle. In other embodiments of the present invention, some or all of these features may be included in either the connector receptacle or the device enclosure.

Figure 3A:
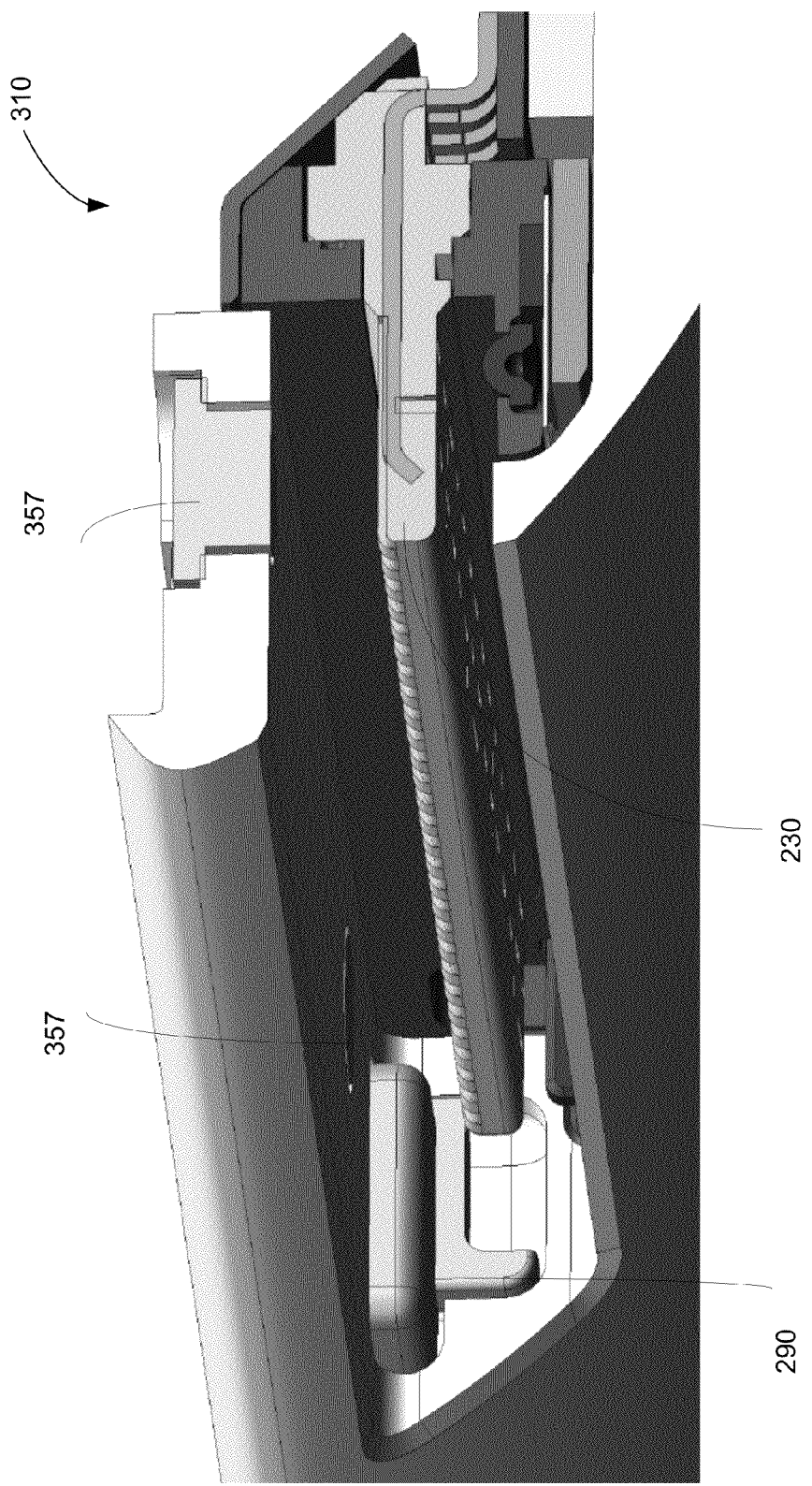

FIG. 3A illustrates another cutaway view of a connector receptacle 310 according to an embodiment of the present invention. Again, latch piece 290 may provide a keying function. Latch piece 290 may also provide an alignment feature such that a connector insert is aligned to tongue 230 when the connector insert is inserted into connector receptacle 310. Ground or EMI contacts 357 may be included to provide an electrical connection to a shield on a connector insert when the connector inserted is inserted into the connector receptacle. Ground contacts 357 may form a ground path from the shield on the connector insert to device enclosure 260. Ground contacts may also provide a wear surface that may act to protect a top inside surface of connector receptacle 310. In various embodiments of the present invention, latch piece 290 may form a ground connection with the connector insert shield, though in other embodiments latch piece 290 may not form a ground connection, or it may form only an intermittent ground connection.

Figure 3B:
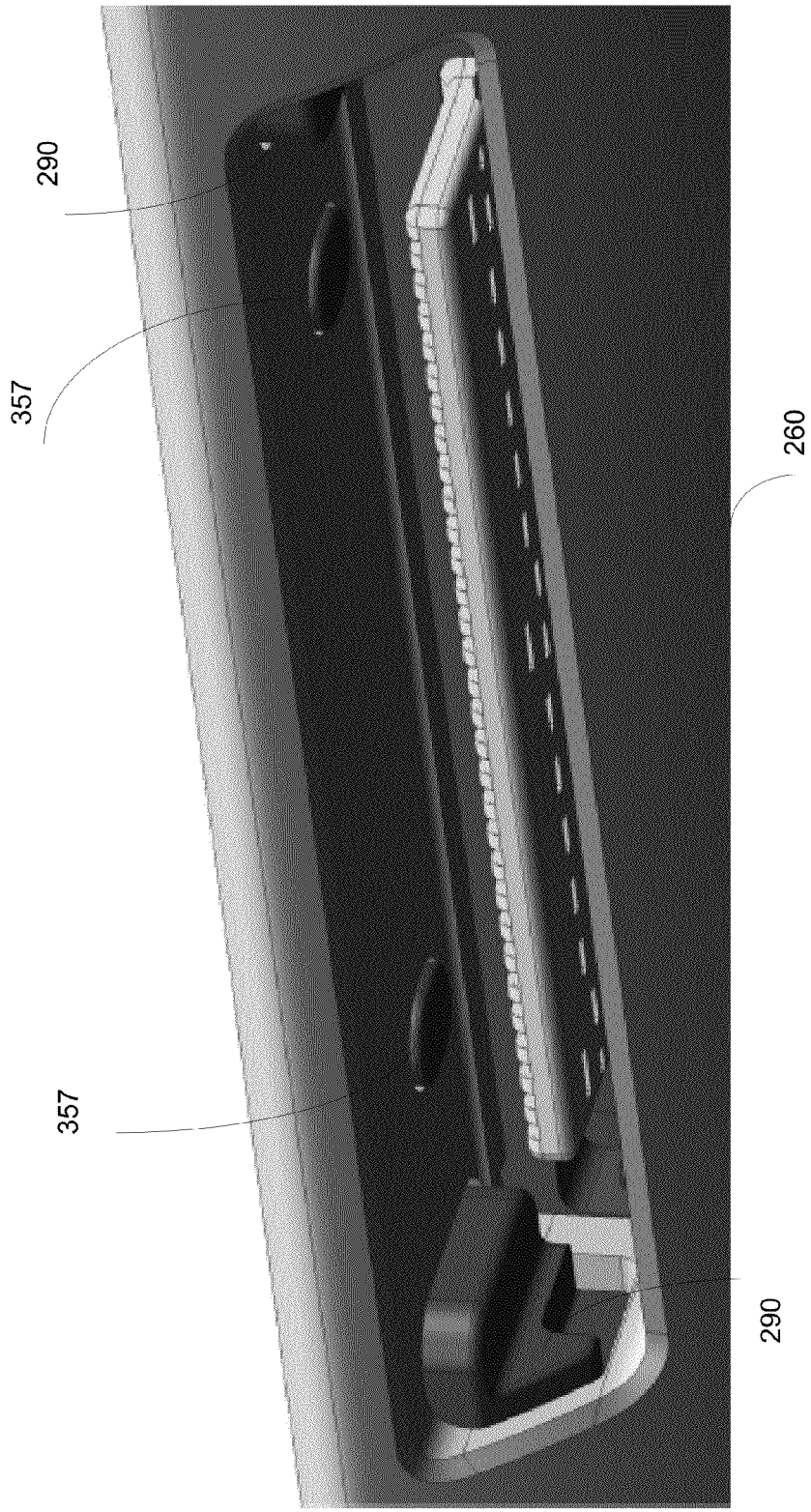
FIG. 3B illustrates a front bottom view of a connector receptacle located in a device housing according to an embodiment of the present invention.

FIG. 3B illustrates a front bottom view of a connector receptacle located in a device housing according to an embodiment of the present invention. In a specific embodiment of the present invention, each latch piece 290 and neighboring ground contact 357 may be formed of a single piece of conductive material. In this specific embodiment, latch piece 290 and ground contacts 357 may be included as a single piece connected to device enclosure 260. In other embodiments of the present invention, each latch piece 290 and ground contact 357 may be a separate piece, while in still other embodiments, both latch pieces 290 and both ground contacts 357 may be formed as a single piece. In other embodiments of the present invention, some or all of these features may be included in either the connector receptacle, as a piece connected to the device enclosure, or they may be formed as part of the device enclosure.

Again, some of the connector receptacle features, such as latch piece 290 and ground contacts 357, may be formed separately from the connector receptacle. This may provide flexibility in that it may allow a connector receptacle to be used in various device enclosures with no or limited modifications. Again, in a specific embodiment of the present invention, each latch piece 290 its neighboring ground contact 357 may be formed as a single piece. These pieces may then be aligned to, and then attached to the device enclosure. Tongue 230 of the connector receptacle may be centered between latch pieces 290. An example is shown in the following figure.

Figure 3C:
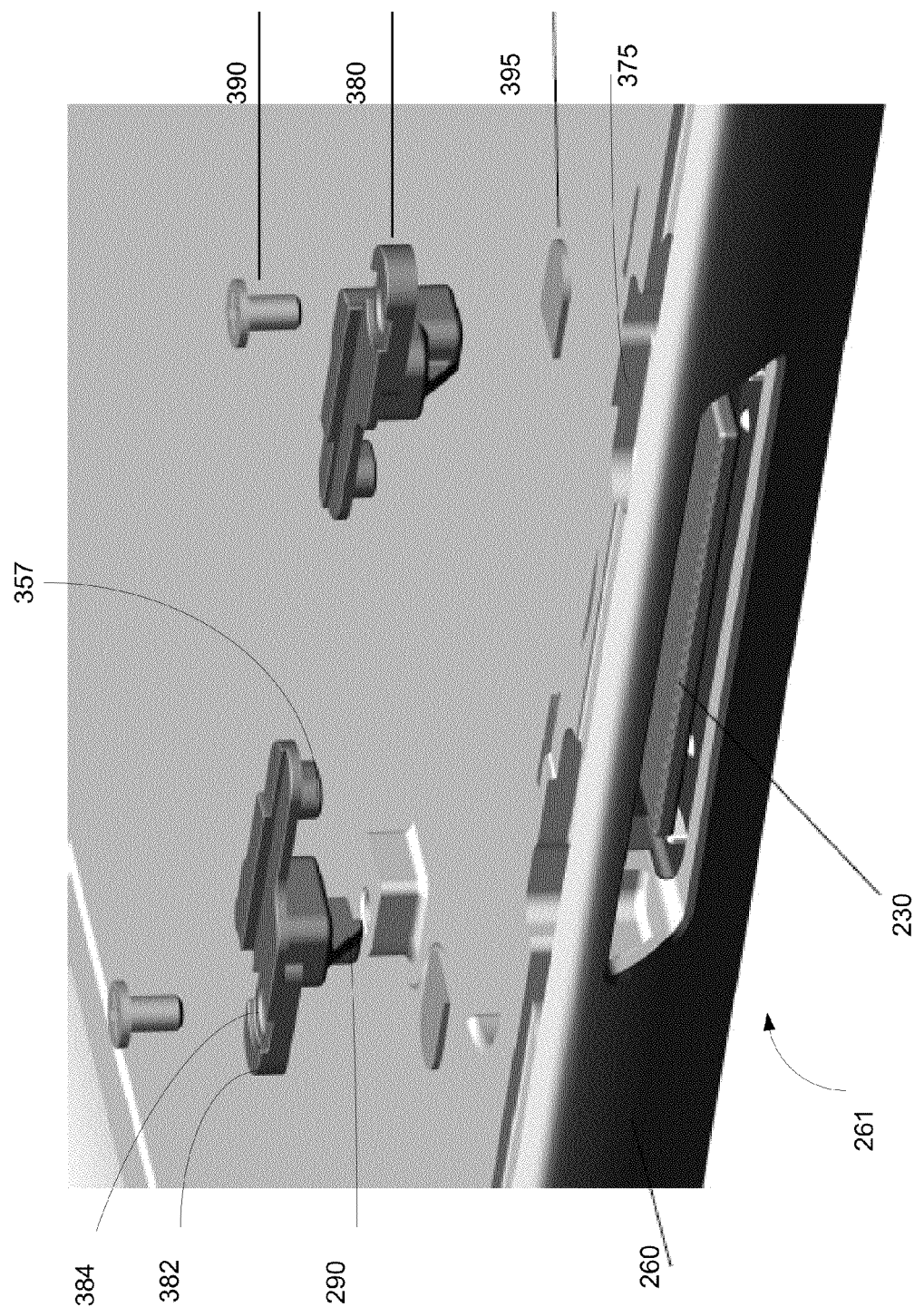
FIG. 3C illustrates an exploded top view of a connector receptacle and device housing according to an embodiment of the present invention.

FIG. 3C illustrates an exploded top view of a connector receptacle and device housing according to an embodiment of the present invention. In this embodiment of the present invention, each latch piece 290 and nearest ground contact 357 may be formed as a single piece 380. During assembly, pieces 380 may be inserted in openings 375 in device enclosure 260. Pieces 380 may be aligned to opening 261 in device enclosure 260, and attached with adhesive 395 and screws 390. Tongue 230 may then be centered between latch pieces 290, and then attached to device enclosure 260.

More specifically, each latch piece 290 and its neighboring ground contact 357 may be formed as a single piece 380.

Piece 380 may be formed by stamping, etching, micro-machining, three-dimensional printing, metal injection molding, or other appropriate process. Piece 380 may be formed of stainless steel, brass, copper, aluminum, ceramic, or other material.

Piece 380 may be inserted into opening 375 in device enclosure 260. In a specific embodiment of the present invention, pieces 380 are aligned to each other and to opening 261. That is, the distance between latch pieces 290 on pieces 380 may be set using a spacer or other tool. By accurately setting this distance, the opening between latch pieces 290 may be set to accept connector inserts. This spacing may also be a factor in determining insertion and retention forces for a connector insert when the connector insert is inserted into the connector receptacle. Once the relative spacing between latch pieces 290 is set, their position relative to opening 261 may be adjusted. By adjusting this position, an attractive appearance may be maintained such that more of one latch piece 290 is not visible at opening 261 as compared to the other. Again, in other embodiments of the present invention, both latch pieces 290 and ground contacts 357 (that is, both pieces 380) may be formed as a single piece. This may allow the distance between latch pieces 290 to be determined by the manufacturing of the single piece.

Each piece 380 may further include arm 382. Arm 382 may be fixed to device enclosure 260 with adhesive 395. Arm 382 may include opening 384. Opening 384 may accept screw 390, which may further fix piece 380 to device enclosure 260. Tongue 230 may then be centered between latch pieces 290. This centering may be done optically, where distances from edges of the tongue 230 to nearby latch pieces 290 are measure and compared, where the tongue is moved until the distances are at least substantially equal. The connector receptacle may then be attached to device enclosure 260.

In other embodiments of the present invention, some of all of these features may be formed in various ways. For example, ground contact 357 may be formed using a setscrew. This set screw can be adjusted vertically such that a bottom surface of the set screw may be accurately positioned relative to other features in or associated with the connector receptacle. This set screw may also be used to fix piece 380 to device enclosure 260.

Again, it may be desirable to be able to use these connector receptacles in various applications. Accordingly, embodiments of the present invention may provide connector receptacles having a tongue that extends from a connector receptacle housing portion. In this way, a device enclosure may be used as the remainder of the connector receptacle housing. This may provide a connector receptacle that may be used in different applications, since each device enclosure may be modified to accept a connector receptacle according to an embodiment of the present invention. For example, in FIGS. 2A and 2B, device housing 260 may have various shapes while still accepting a connector receptacle according to an embodiment of the present invention, such as connector receptacle 210. Also, by having much of the connector receptacle housing formed with the device enclosure, an aesthetically pleasing and seamless appearance for the overall connector receptacle may be achieved. An example is shown in the following figure.

Figure 4:
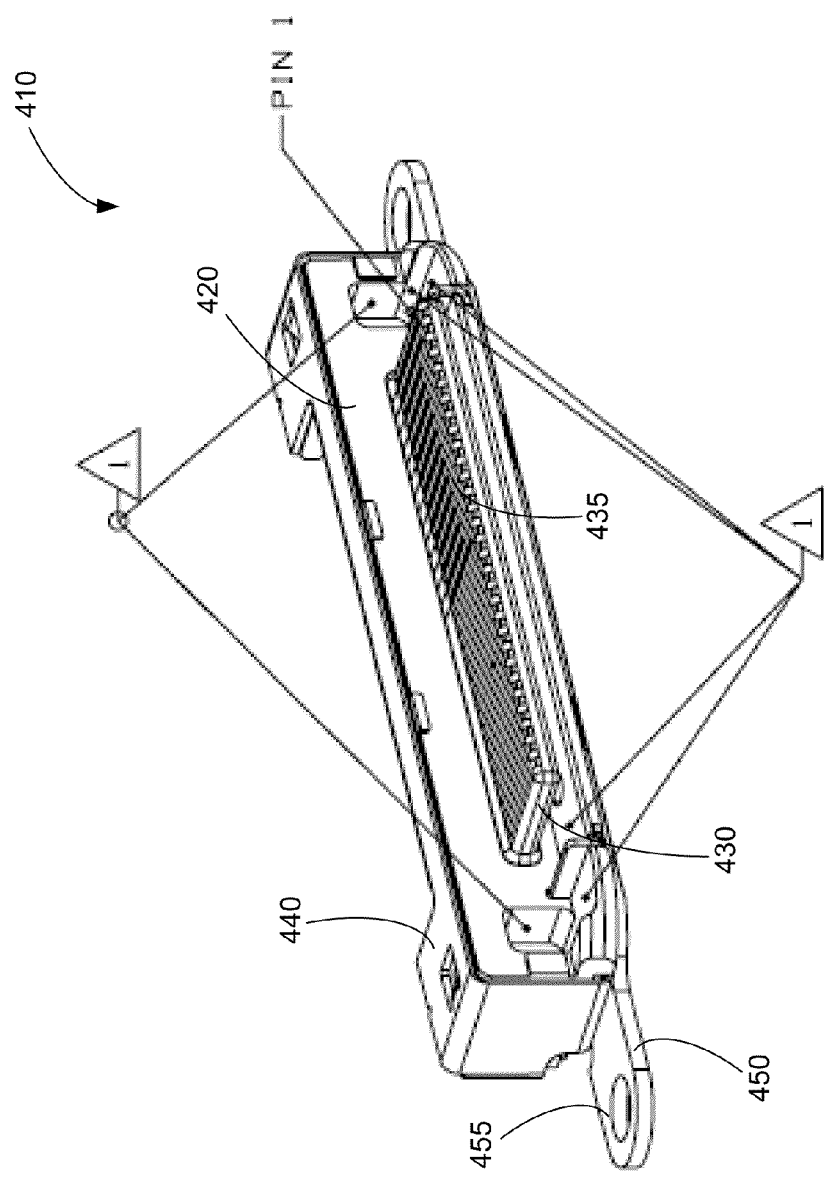
FIG. 4 illustrates a connector receptacle according to an embodiment of the present invention.

FIG. 4 illustrates a connector receptacle 410 according to an embodiment of the present invention. As before, tongue 430 may extend from connector receptacle housing portion 420. A number of contacts 435 may be placed on tongue 430. Shield 440 may be used to protect connector receptacle 410 from electromagnetic interference, and may protect associated circuitry from electromagnetic interference generated in connector receptacle 410. Mounting bracket 450 may attach to shield 440. Mounting bracket 450 may include holes 455, which may accept a fastener that may be used for attaching connector receptacle 410 to a device enclosure (not shown).

In various embodiments of the present invention, shield 440 may have various shapes. For example, a back portion of shield 440 may be sloped to reduce the space consumed by connector receptacle 410. An example is shown in the following figure.

Figure 5:
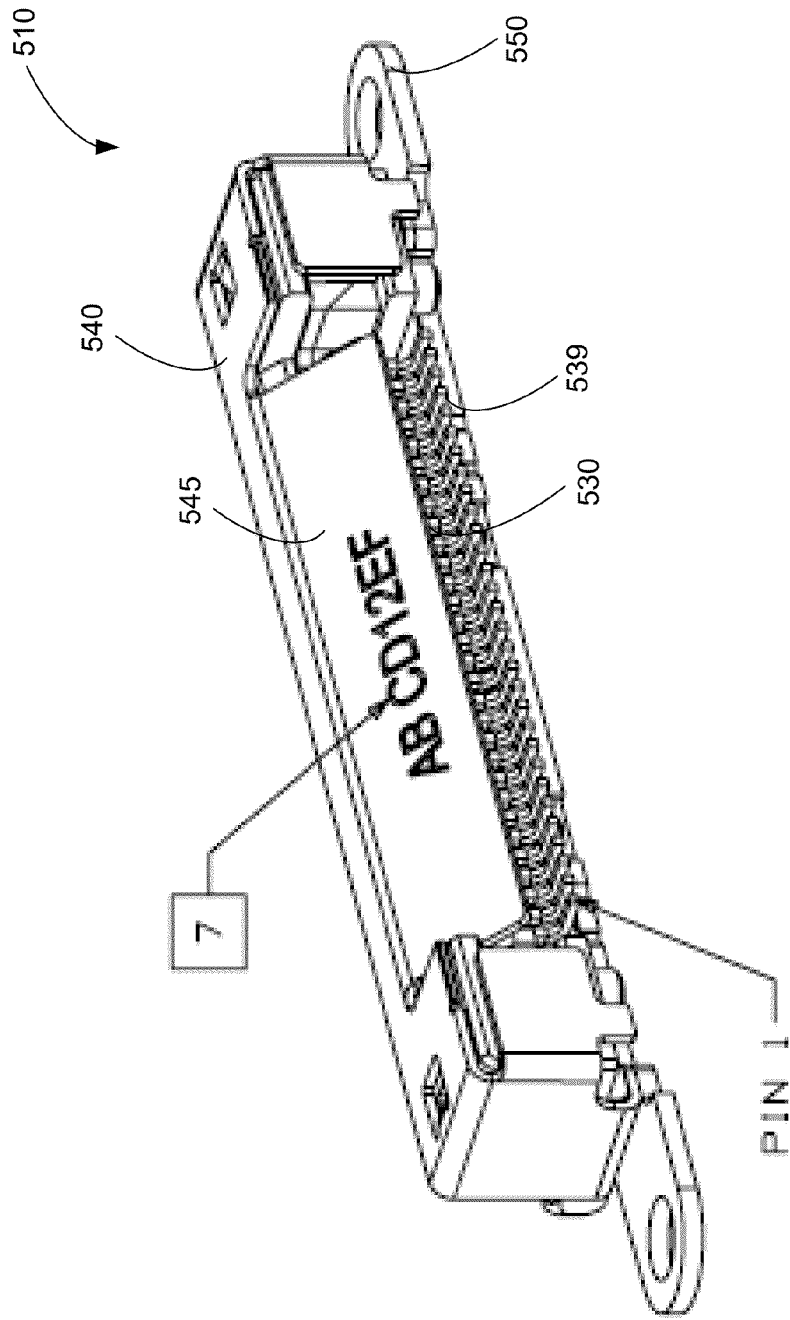
FIG. 5 illustrates another view of a connector receptacle according to an embodiment of the present invention.

FIG. 5 illustrates another view of a connector receptacle 510 according to an embodiment of the present invention. Connector receptacle 510 may include shield 540, which may be attached to mounting bracket 550. Shield 540 may include a sloped back portion 545. Back portion 545 may be sloped to reduce the space inside the electronic device that is consumed by connector receptacle 510. Surface mount contact portions 539 of contacts 530 may be soldered to a flexible circuit board, printed circuit board, or other appropriate substrate.

Figure 6:
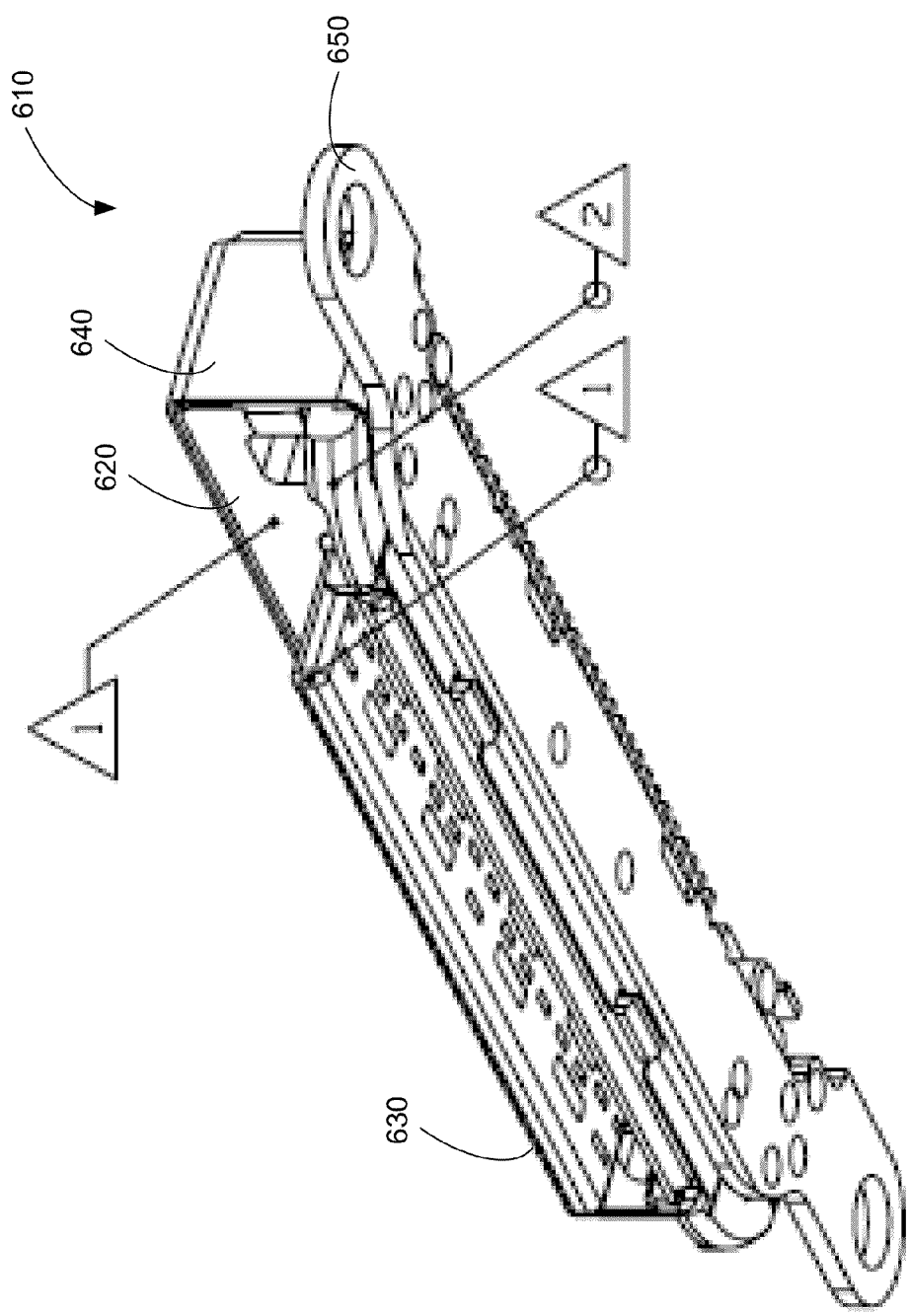
FIG. 6 illustrates a bottom view of a connector receptacle according to an embodiment of the present invention.

FIG. 6 illustrates a bottom view of a connector receptacle 610 according to an embodiment of the present invention. Connector receptacle 610 may include shield 640, which may be attached to mounting bracket 650. As before, tongue 630 may extend from first housing portion 620.

Figure 7:
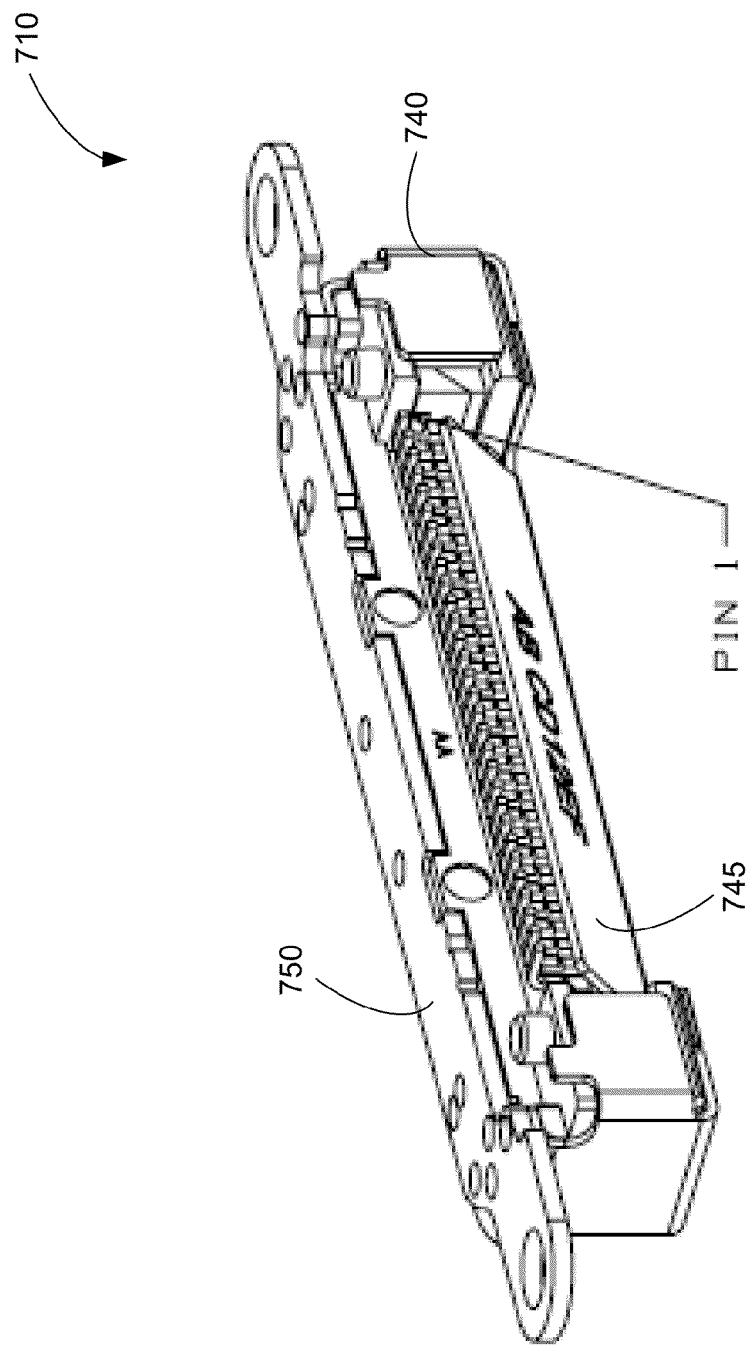
FIG. 7 illustrates another view of a connector receptacle according to an embodiment of the present invention.

FIG. 7 illustrates another view of a connector receptacle 710 according to an embodiment of the present invention. Again, shield 740 may attach to mounting bracket 750. Shield 740 may have sloped portion 745. Again, sloped portion 745 may be angled to reduce space consumed by connector receptacle 710.

Figure 8:
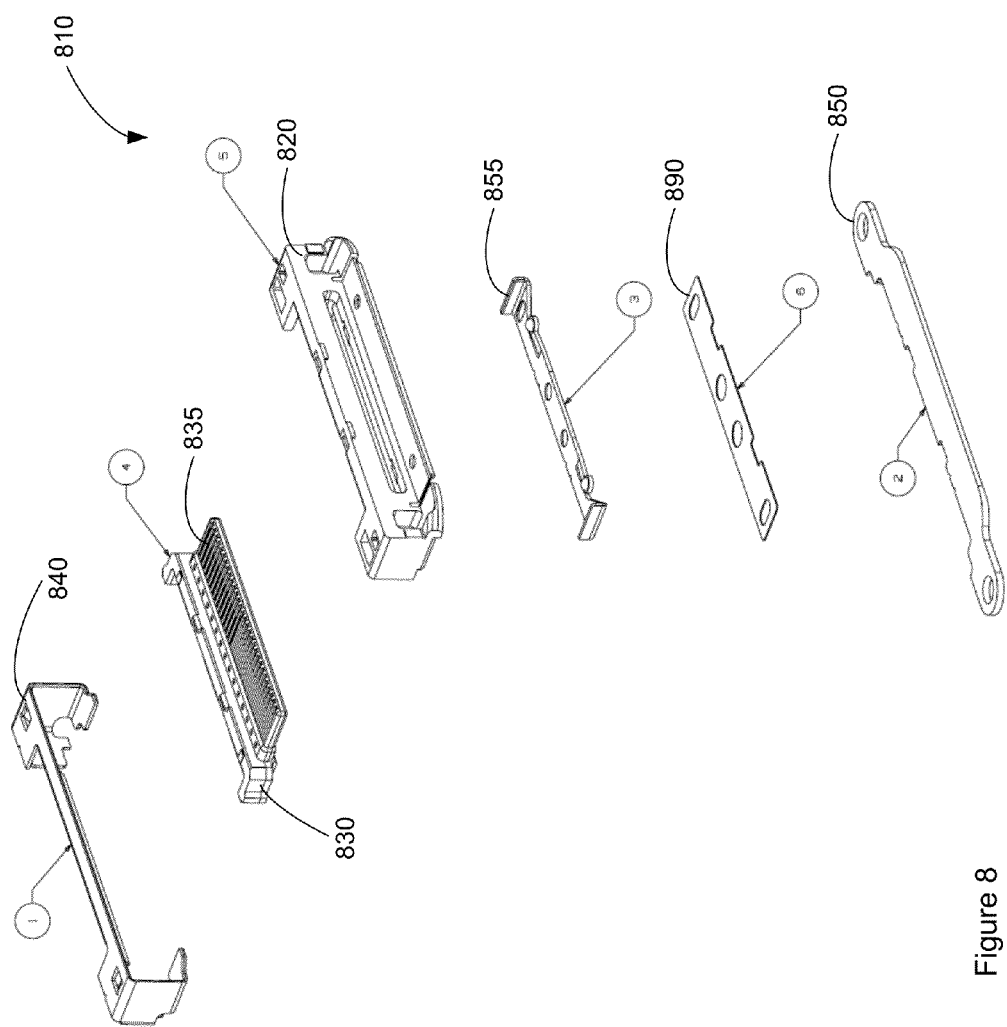
FIG. 8 illustrates an exploded view of a connector receptacle according to an embodiment of the present invention.

FIG. 8 illustrates an exploded view of a connector receptacle 810 according to an embodiment of the present invention. Connector receptacle 810 may include tongue portion 830. Tongue portion 830 may be insertion molded around a number of contacts 835. Tongue portion 830 may be formed to snap into housing portion 820. When tongue portion 830 is fit into housing portion 820, tongue 830 may extend beyond housing portion 820. Shield 840 may be placed over housing portion 820 to protect circuitry inside, or associated with, the electronic device from electromagnetic interference, and to protect signals on contacts in connector receptacle 810 from electromagnetic interference caused by circuitry inside, or associated with, the electronic device.

Again, it may be desirable to provide a connector receptacle having a simplified manufacturing process. Accordingly, embodiments of the present invention provide connector receptacles where various metallic pieces may be assembled a single manufacturing step. For example, these pieces may be soldered, welded, or otherwise fixed to each other in a single manufacturing step.

Specifically, first metallic piece 855 may be attached to mounting bracket 850 using tape 890. This may be done to hold first metallic piece 855 in place during the subsequent manufacturing step. These pieces may then be attached to shield 840 and a single manufacturing step. Specifically, first metallic piece or EMI bracket 855 and mounting bracket 850 may be soldered, stacked, fused, or otherwise attached to shield 840 in a single manufacturing step. A method of manufacturing this connector receptacle is shown in the following figure.

Figure 9:
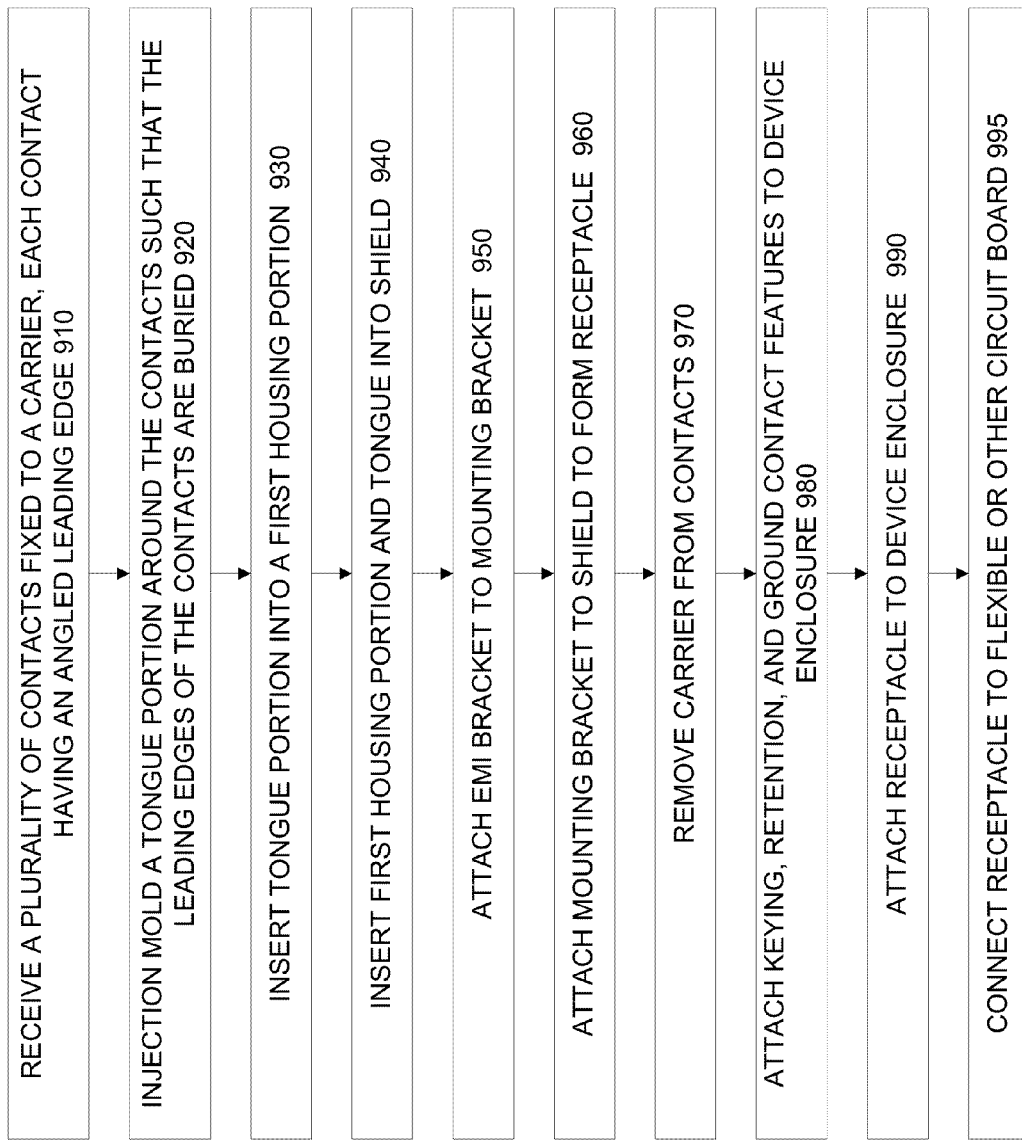
FIG. 9 illustrates a method of assembling a connector receptacle according to an embodiment of the present invention.

FIG. 9 illustrates a method of assembling a connector receptacle according to an embodiment of the present invention. In act 910, a plurality of contacts fixed to a carrier are received. Each contact may have an angled leading edge. In act 920, a tongue portion may be injection molded around contacts, such that the leading edges of the contacts are buried in the tongue. The tongue portion may then be inserted into a first housing portion in act 930. The first housing portion may be inserted into a shield in act 940. In act 950, an EMI bracket (such as first metallic piece 855) may be attached to a mounting bracket. The mounting bracket and EMI bracket combination may be attached to the shield to form connector receptacle in act 960. At this point, the connector receptacle may be stored or stocked for later use.

In act 970, the carrier may be removed from the contacts. Keying, ground contact, and retention features may be attached to a device enclosure as needed in act 980. In act 990, the connector receptacle may be attached to the device enclosure. In act 995, the connector receptacle may be attached to a flexible or other circuit board.

Detailed views of some of the portions of a connector receptacle according to an embodiment of the present invention are shown in the following figures.

Figure 10:
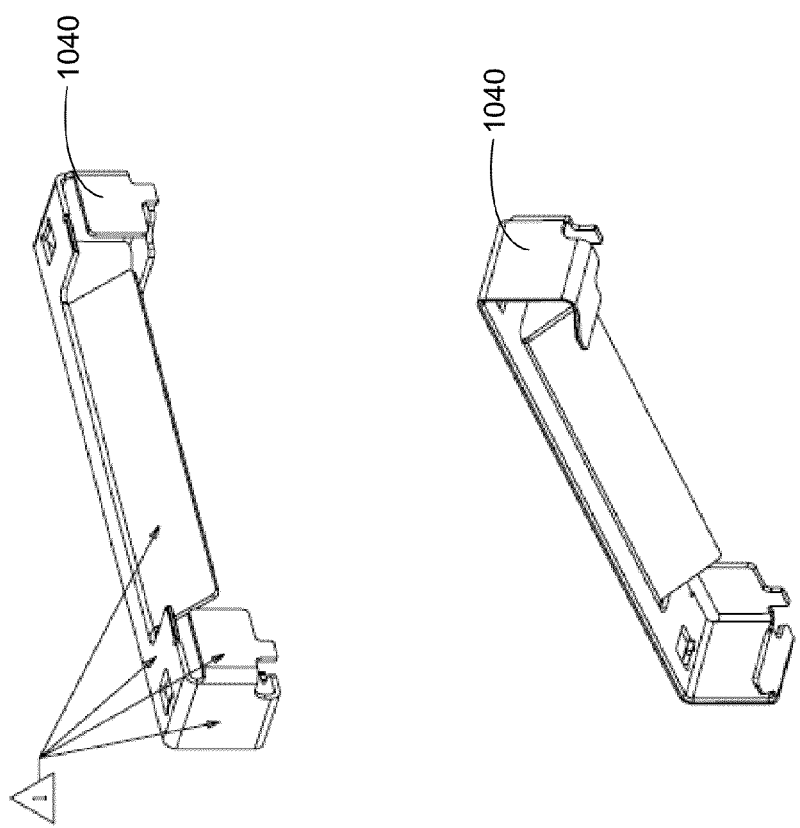
FIG. 10 illustrates views of a shield according to an embodiment of the present invention.

FIG. 10 illustrates views of a shield 1040 according to an embodiment of the present invention. In various embodiments of the present invention, shield 140 may include fingers or other contacts to contact a device enclosure to provide further electromagnet interference protection.

Figure 11:
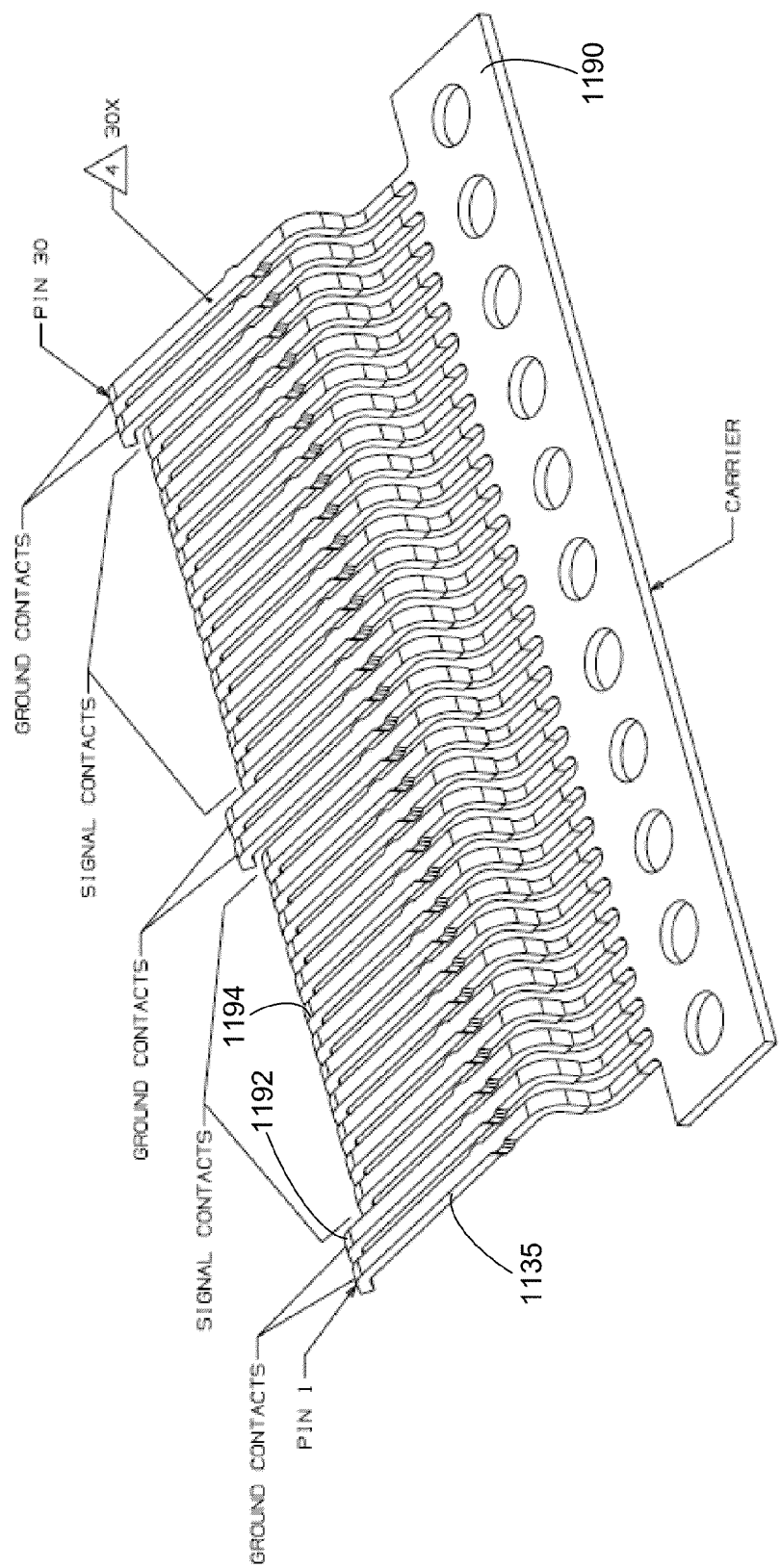
FIG. 11 illustrates a number of contacts attached to a carrier according to an embodiment of the present invention.

FIG. 11 illustrates a number of contacts 1135 attached to carrier 1190 according to an embodiment of the present invention. In this example, contacts 1135 include one or more ground contacts 1192, which are longer than one or more other contacts 1194. By having ground contacts 1192 be comparatively longer, ground connections are formed first during the insertion of a connector insert, thereby protecting electronic circuitry attached to contacts 1135. After assembly of a connector receptacle, carrier 1190 may be removed.

Figure 12:
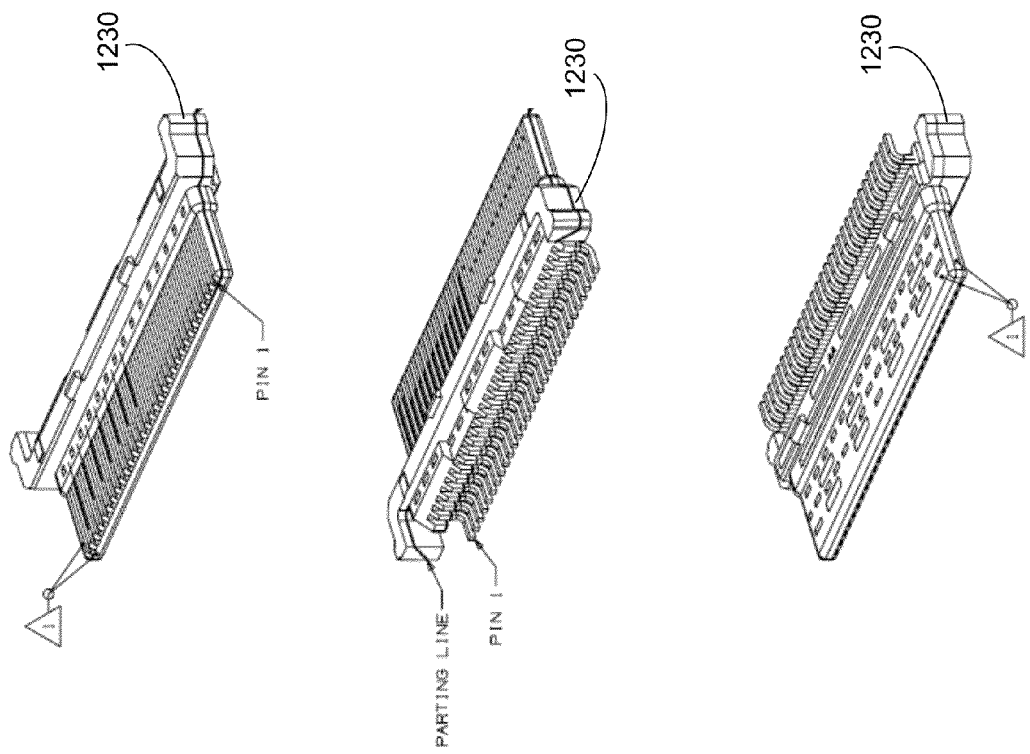
FIG. 12 illustrates views of a tongue that may be used in a connector receptacle according to an embodiment of the present invention.

FIG. 12 illustrates views of tongue 1230 that may be used in a connector receptacle according to an embodiment of the present invention.

Figure 13:
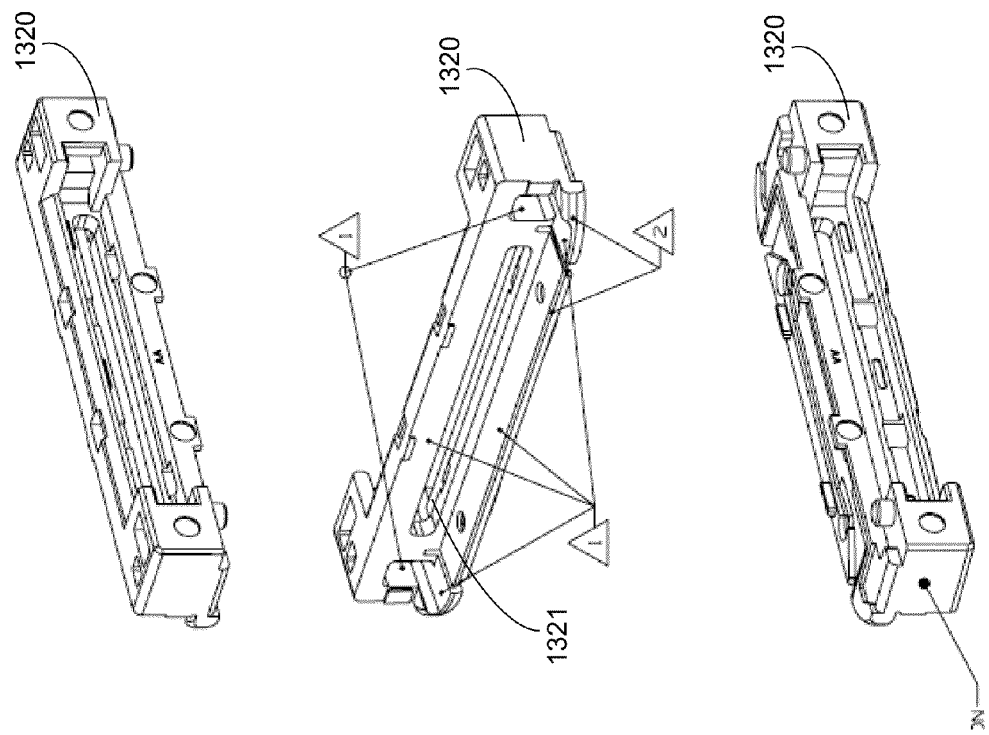
FIG. 13 illustrates views of a connector housing that may be used in a connector receptacle according to an embodiment of the present invention.

FIG. 13 illustrates views of connector housing 1320 that may be used in a connector receptacle according to an embodiment of the present invention. Connector housing 1320 may include opening 1321, which may accept a tongue, such as tongue 1230.

Figure 14:
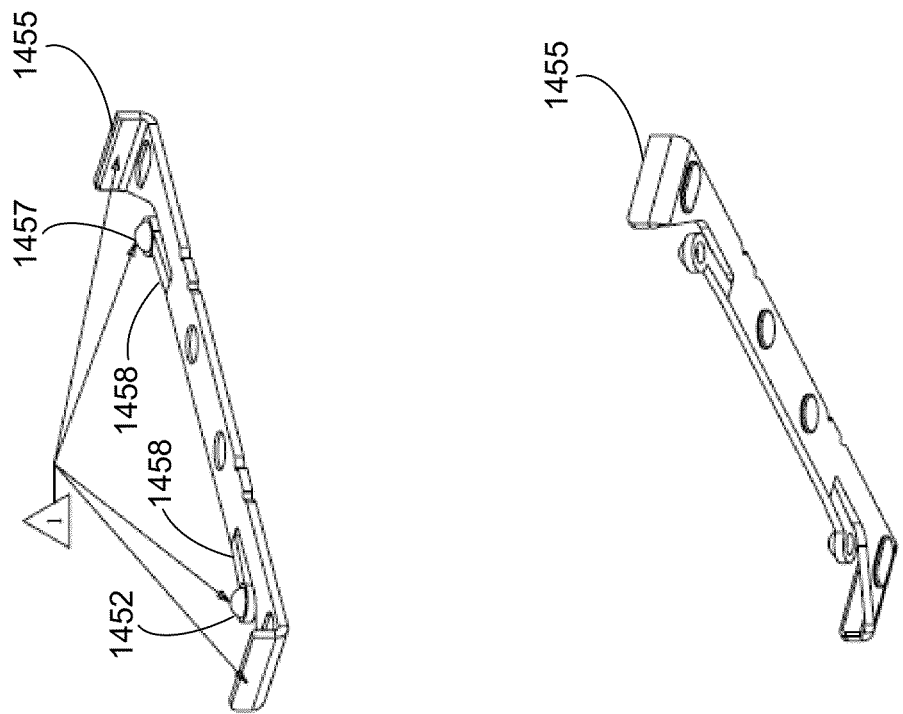
FIG. 14 illustrates a first metallic portion or EMI bracket that may be used in a connector receptacle according to an embodiment of the present invention.

FIG. 14 illustrates first metallic portion or EMI bracket 1455 that may be used in a connector receptacle according to an embodiment of the present invention. Metallic bracket 1455 may include EMI or ground contacts 1457, which may be used as ground contacts 257 in FIGS. 2A and 2B. EMI or ground contacts 1457 may be located at ends of fingers 1458. Fingers 1458 may be bent slightly upward. In this way, EMI contacts 1457 may deflect downward or out of the way to allow insertion of a connector insert. EMI contacts 1457 may form electrical connections with a shield around a connector insert to improve EMI shielding around the connector receptacle. EMI contacts 1457 may have a domed or spherical-shaped top portion. This shape may provide a smooth surface thus preventing the marring of connector inserts. EMI bracket 1455 may include up-turned ends 1459 that may be used as keys, such as keys 259 in FIGS. 2A and 2B.

In the above embodiments of the present invention, EMI or ground contacts, such as ground contacts 257 and 357, may be used to form electrical connections to a shield on a connector insert for EMI purposes. In other embodiments of the present invention, other EMI connections may be employed to reduce noise, cross-talk, and improve signal integrity. An example is shown in the following figures.

Figure 15:
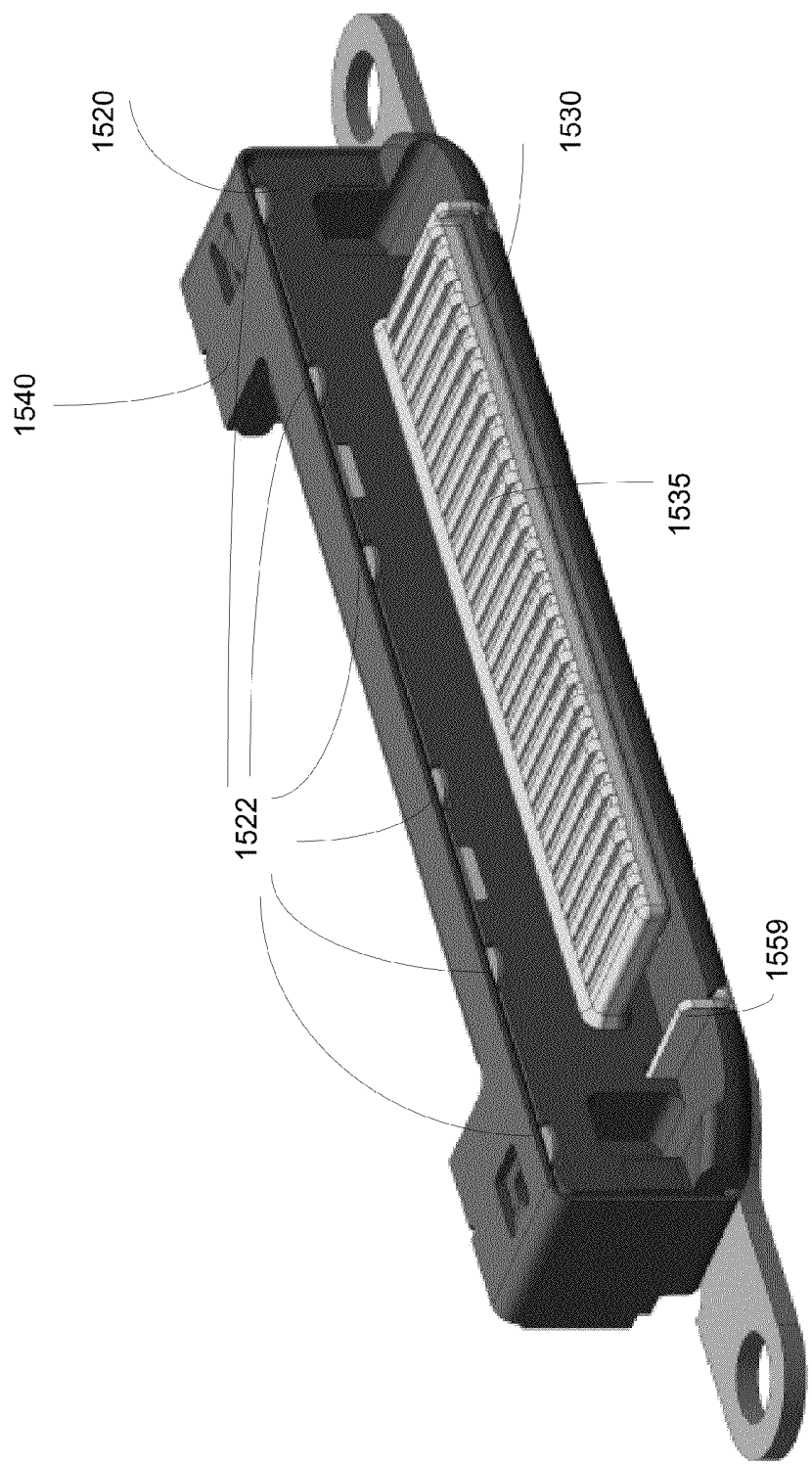
FIG. 15 illustrates a front view of another connector receptacle according to an embodiment of the present invention.

FIG. 15 illustrates a front view of another connector receptacle according to an embodiment of the present invention. A number of contacts 1535 may reside on tongue 1530, which may extend from housing portion 1520, which may be covered by shield 1540. Keys 1559 may be included. EMI tabs 1522 may extend from first housing portion 1520. EMI tabs 1522 may contact a shield of a connector insert when the connector insert is inserted. EMI tabs 1522 may be electrically connected to connector receptacle shield 1540. EMI tabs 1522 may be flexible such that they bend back to shield 1540 and provide positive pressure to aid in forming contact with a connector insert shield.

Figure 16:
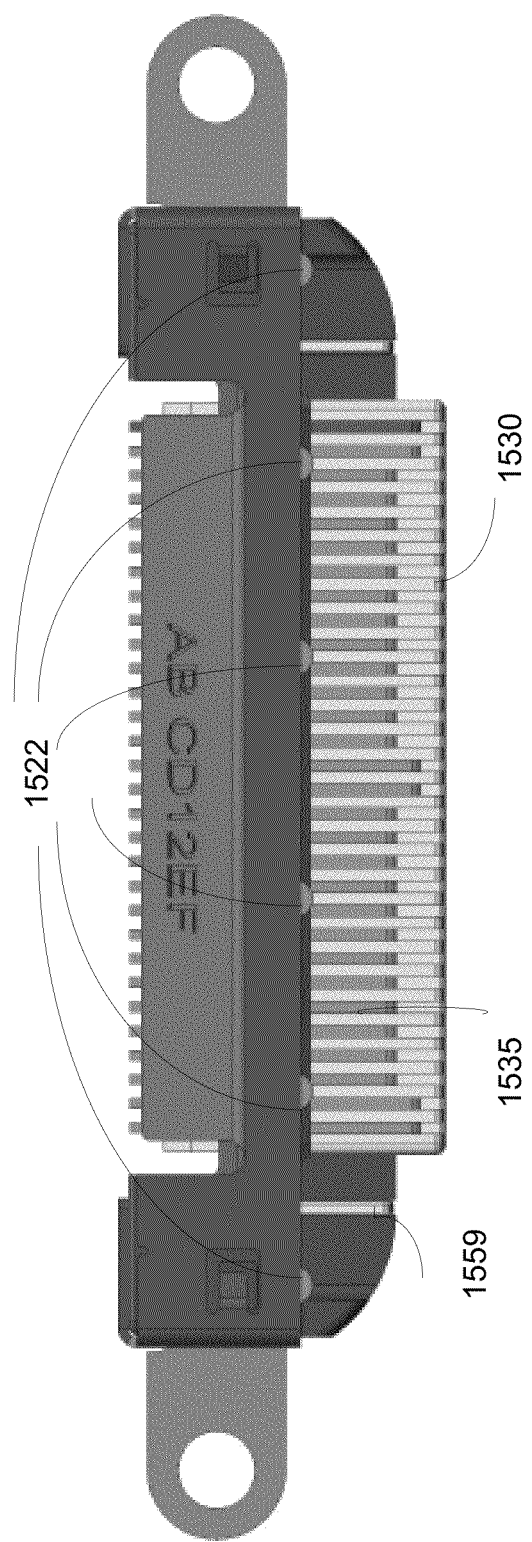
FIG. 16 illustrates a top view of another connector receptacle according to an embodiment of the present invention.

FIG. 16 illustrates a top view of another connector receptacle according to an embodiment of the present invention. A tab or EMI tab strip that may be used to form tabs 1522 is shown in the following figure.

Figure 17:
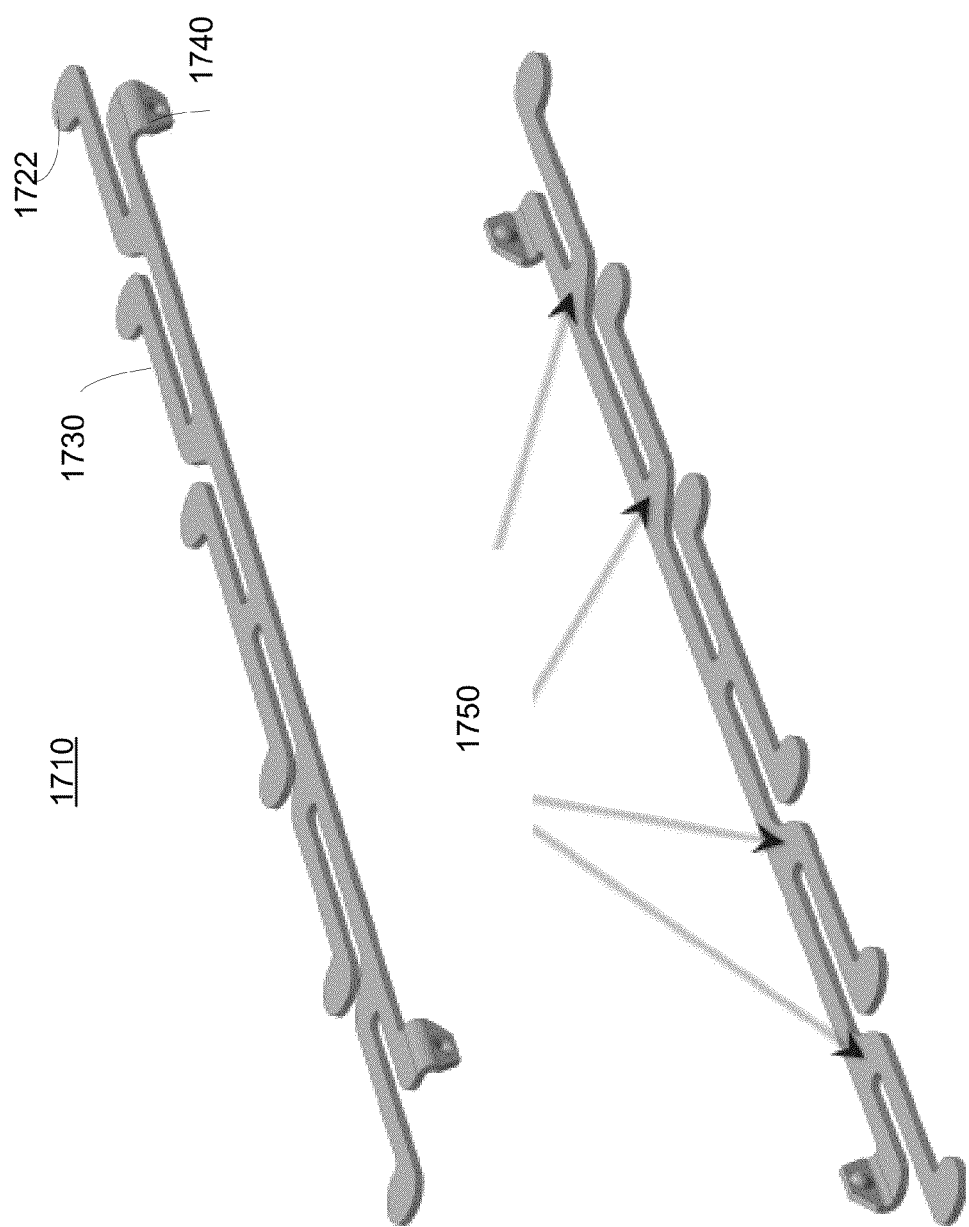
FIG. 17 illustrates a tab strip that may be used to form EMI tabs for a connector receptacle according to an embodiment of the present invention.

FIG. 17 illustrates a tab or EMI tab strip that may be used to form EMI tabs for a connector receptacle according to an embodiment of the present invention. EMI tab strip 1710 may be formed from a sheet of metal. EMI tab strip 1710 may include a number of EMI tabs 1722. Each EMI tab 1722 may be on an EMI arm or beam 1730 that may provide a spring or positive force when an EMI tab 1722 is depressed due to contact by a connector insert. EMI tab strip 1710 may include bent portions 1740, which may be inserted into a housing portion during assembly. In a specific embodiment of the present invention, EMI tab strip 1710 may be laser-welded or otherwise attached to a shield, such as shield 1540, at points 1750. A method of manufacturing this connector receptacle is shown in the following figure.

Figure 18:
FIG. 18 illustrates another method of assembling a connector receptacle according to an embodiment of the present invention.

FIG. 18 illustrates another method of assembling a connector receptacle according to an embodiment of the present invention. In act 1810, a plurality of contacts fixed to a carrier are received. Each contact may have an angled leading edge. In act 1820, a tongue portion may be injection molded around contacts, such that the leading edges of the contacts are buried in the tongue. The tongue portion may then be inserted into a first housing portion in act 1830. In act 1835, an EMI tab strip may be inserted into the first housing portion. The first housing portion may be inserted into a shield in act 1840. In act 1850, an EMI bracket (such as first metallic piece 855) may be attached to a mounting bracket. The mounting bracket and EMI bracket combination may be attached to the shield to form connector receptacle in act 1860. At this point, the connector receptacle may be stored or stocked for later use.

In act 1870, the carrier may be removed from the contacts. Keying, ground contact, and retention features may be attached to a device enclosure as needed in act 1880. In act 1890, the connector receptacle may be attached to the device enclosure. In act 1895, the connector receptacle may be attached to a flexible or other circuit board.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A connector receptacle comprising:
   a first housing portion;
   a tongue extending from the first housing portion and configured to snap into the first housing portion;
   a plurality of contacts in the tongue, wherein a front portion of each of the plurality of contacts is angled such that a front edge is embedded in the tongue;
   a shield around the first housing portion;
   a mounting bracket attached to the shield; and a first metallic piece between the mounting bracket and the housing and comprising a plurality of ground contacts.

2. The connector receptacle of claim 1 wherein the connector receptacle is formed to mate with a second housing portion formed with a device enclosure.

3. The connector receptacle of claim 1 wherein the plurality of contacts comprises at least one ground contact, the ground contact longer than at least one other contact in the plurality of contacts.

4. The connector receptacle of claim 1 further comprising:
a piece of tape to hold the first metallic piece to the mounting bracket during manufacturing.

5. The connector receptacle of claim 1 wherein the plurality of electromagnetic contacts each have a dome-shaped top.

6. The connector receptacle of claim 1 wherein each of the plurality of electromagnetic contacts has a spherical-shaped top.

7. The connector receptacle of claim 1 wherein each of the plurality of electromagnetic contacts is at an end of a finger portion.

8. The connector receptacle of claim 1 further comprising a plurality of EMI tabs extending from the first housing portion.

9. A method of forming a connector receptacle, the method comprising:
receiving a plurality of contacts attached to a carrier, each contact having an angled front portion;
injection molding a tongue portion around the contacts such that leading edges of the front portions of the contacts are buried;
after injection molding the tongue portion, removing the carrier from the plurality of contacts; then inserting the tongue portion into a first housing portion;
inserting the first housing portion into a shield;
attaching a first metallic piece having first and second ground contacts to a mounting bracket; and
attaching the mounting bracket and the first metallic piece to the shield.

10. The method of claim 9 wherein the plurality of contacts comprises at least one ground contact, the ground contact longer than at least one other contact in the plurality of contacts.

11. The method of claim 9 wherein the front portions of the contacts are angled at approximately 45 degrees.

12. The method of claim 9 wherein the tongue portion is molded to snap into the first housing portion.

13. The method of claim 9 wherein the tongue extends beyond the first housing portion.

14. The method of claim 9 wherein the first metallic piece is attached to the mounting bracket using tape.

15. The method of claim 9 wherein attaching the mounting bracket and the first metallic piece to the shield comprises:
attaching the mounting bracket and the first metallic piece to the shield in a single manufacturing step.

16. An electronic device comprising:
a device enclosure, the device enclosure having an opening and forming a first portion of a housing for a connector receptacle; and
a connector receptacle, the connector receptacle comprising:
a second housing portion;
a tongue extending from the second housing portion and fitted to snap into the second housing portion;
a plurality of contacts in the tongue, wherein a front portion of each of the plurality of contacts is angled such that a front edge is embedded in the tongue;
an EMI tab strip including a plurality of EMI tabs extending from the second housing portion;
a shield around the first housing portion and in electrical contact with the EMI tab strip;
a mounting bracket attached to the shield; and
a first metallic piece between the mounting bracket and the shield and comprising a plurality of electromagnetic contacts,
a plurality of latch pieces, one on each side of the opening in the device enclosure; and
a plurality of ground contacts in a topside of the opening in the device enclosure,
wherein each of the latch pieces are formed as a single piece with a neighboring one of the plurality of ground contacts.

17. The electronic device of claim 16 wherein each single piece is formed using metal injection molding.

18. The electronic device of claim 16 wherein each single piece is fixed to the device enclosure using an adhesive and a screw.

19. The electronic device of claim 16 wherein each of the plurality of electromagnetic contacts has a spherical-shaped top.

20. The electronic device of claim 16 wherein each of the plurality of electromagnetic contacts is at an end of a finger portion.

21. The electronic device of claim 16 wherein the electronic device is a portable computing device.

22. The electronic device of claim 16 wherein the electronic device is a portable media player.

23. A connector receptacle comprising:
a first housing portion;
a tongue extending from the first housing portion;
a plurality of contacts in the tongue;
a shield around the first housing portion;
a mounting bracket attached to the shield; and
a first metallic piece between the mounting bracket and the shield and comprising a plurality of ground contacts;
a plurality of EMI tabs extending from the first housing portion, wherein each tab is located at an end of a beam, each of the beams attached to a strip, the strip located between the first housing portion and the shield, the strip welded to the shield.

24. The connector receptacle of claim 23 wherein the strip is laser welded to the shield.

25. The connector receptacle of claim 23 wherein the EMI tabs, beams, and strip are stamped from a plane of sheet metal, and when a connector insert is mated with the connector receptacle, the plurality of EMI tabs contact the connector insert and the beams deflect in a direction of the plane of sheet metal.

26. The connector receptacle of claim 23 wherein a front portion of each of the plurality of contacts is angled such that a front edge is embedded in the tongue.

27. An electronic device comprising:
a device enclosure, the device enclosure having an opening and forming a first portion of a housing for a connector receptacle;
a connector receptacle, the connector receptacle comprising:
a second housing portion;
a tongue extending from the second housing portion;
a plurality of contacts in the tongue;
an EMI tab strip including a plurality of EMI tabs extending from the second housing portion;
a shield around the first housing portion and in electrical contact with the EMI tab strip;

a mounting bracket attached to the shield; and
   a first metallic piece between the mounting bracket and the shield;
   a first piece forming a latch on a first side of the opening in the device enclosure and forming a first ground contact on a top of the opening in the device enclosure; and
   a second piece forming a latch on a second side of the opening in the device enclosure and forming a second ground contact on a top of the opening in the device enclosure.

28. The electronic device of claim 27 wherein the tongue is fitted to snap into the second housing portion.

29. The electronic device of claim 27 wherein a front portion of each of the plurality of contacts is angled such that a front edge is embedded in the tongue.

30. The electronic device of claim 27 wherein the first piece and the second piece are formed using metal injection molding.

31. The electronic device of claim 27 wherein the first piece and the second piece are fixed to the device enclosure using an adhesive and a screw.

* * * * *

UNITED STATES PATENT AND TRADEMARK OFFICE
CERTIFICATE OF CORRECTION

| | | |
|---|---|---|
| PATENT NO. | : 8,662,934 B2 | |
| APPLICATION NO. | : 13/412587 | |
| DATED | : March 4, 2014 | |
| INVENTOR(S) | : Robert Scritzky et al. | |

It is certified that error appears in the above-identified patent and that said Letters Patent is hereby corrected as shown below:

In the claims please make the correction as shown below:

Column 12, Line 5, Claim 16: please delete "and".

Signed and Sealed this
Thirteenth Day of May, 2014

Michelle K. Lee
*Deputy Director of the United States Patent and Trademark Office*